United States Patent
Lu et al.

(10) Patent No.: US 8,181,869 B2
(45) Date of Patent: May 22, 2012

(54) METHOD FOR CUSTOMIZING CUSTOMER IDENTIFIER

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 391 days.

(21) Appl. No.: 11/823,826

(22) Filed: Jun. 28, 2007

(65) Prior Publication Data

US 2008/0000971 A1    Jan. 3, 2008

(30) Foreign Application Priority Data

Jun. 29, 2006   (CN) .......................... 2006 1 0090585

(51) Int. Cl.
*G06F 19/00*    (2011.01)
*G06Q 30/00*    (2012.01)
*G06Q 90/00*    (2006.01)

(52) U.S. Cl. ........ 235/385; 235/379; 235/380; 235/382; 235/382.5; 705/18; 705/44; 705/64; 705/67

(58) Field of Classification Search ................. 35/382.5; 235/379, 380, 382, 382.5, 385; 705/18, 44, 705/64, 67
See application file for complete search history.

(56) References Cited

U.S. PATENT DOCUMENTS

| | | | |
|---|---|---|---|
| 6,658,586 B1 * | 12/2003 | Levi | 714/4 |
| 2001/0047335 A1 * | 11/2001 | Arndt et al. | 705/44 |
| 2001/0056409 A1 * | 12/2001 | Bellovin et al. | 705/64 |
| 2002/0141575 A1 * | 10/2002 | Hird | 380/44 |
| 2004/0117301 A1 * | 6/2004 | Fujisawa et al. | 705/39 |
| 2006/0186200 A1 * | 8/2006 | Nochta | 235/382 |
| 2006/0283936 A1 * | 12/2006 | Piccirillo et al. | 235/381 |
| 2008/0164304 A1 * | 7/2008 | Narasimhan et al. | 235/375 |

FOREIGN PATENT DOCUMENTS

| | | |
|---|---|---|
| CN | 1540583 | 10/2004 |
| CN | 1622509 | 6/2005 |

* cited by examiner

*Primary Examiner* — Ali Sharifzada
(74) *Attorney, Agent, or Firm* — Harness, Dickey & Pierce, P.L.C.

(57) ABSTRACT

The present invention provides a method for customizing customer identifier. To resolve the problems in customizing the identifier in the electronic device by the manufacturer for its customers, such as high management cost, stock, and possibility of error, as well as the security problem in customizing the identifier by the customer itself, and the problem of counterfeiting by others, the method provided comprises generating an irreversible identifier from a seed data input by the customer using some one-way algorithm(s) and storing that identifier in the electronic device. For the manufacturer, both the management cost and the stock are reduced, and the error possibility of the product after leaving the factory as well. For the customer, the security of customizing the identifier is ensured, and its identifier cannot be counterfeited by other peers any more.

5 Claims, 1 Drawing Sheet

METHOD FOR CUSTOMIZING CUSTOMER IDENTIFIER

CROSS-REFERENCES TO RELATED APPLICATIONS

This application claims priority to Chinese Application No. 200610090585.6, filed on Jun. 29, 2006, the contents of which are hereby incorporated by reference for all purposes.

FIELD OF THE INVENTION

The present invention relates to a method for customizing customer identifier.

BACKGROUND OF THE INVENTION

When a customer (typically, an integrator or a distributor or channel partner) needs to customize its identifier in an electronic device, normally, the identifier is written into a non-volatile memory of the electronic device by a manufacturer before the electronic device leaves factory. The memory can keep data from loss even if powered off. Though the demand from the customer is satisfied in this way, some troubles are inevitably brought to the manufacturer. Because the manufacturer has to serve a number of customers and for each of the customers a product line has to be provided so as to support the customization, which results in increasing the management cost and the stock. Moreover, the situation may happen in which the identifier is customized in error.

A further method for customizing customer identifier is that the customer itself may write the identifier into the electronic device. That is, the customer may directly write the identifier into the non-volatile memory of the electronic device through an application interface of the electronic device provided by the manufacturer, which is an interface between application software and the electronic device. With this method, the information that the user could read is completely the same as the information that the user has written. As a result, this may have the tendency to influence the security of the information customized by the customer, and lead to counterfeit or piracy of the identifier among different customers. For example, a customer A might obtain the identifier of another customer B and write it to the "empty" electronic device ordered from the manufacturer to counterfeit the device.

Generally, the algorithms used to encrypt data are divided into two types: one-way and two-way.

The one-way algorithm, also known as the Hash algorithm, is an algorithm that the original information cannot be reversely deduced even if the result and the algorithm itself are known. Frequently used one-way algorithms are MD5, SHA-1, and RIPEMD Series etc. The Hash function could produce a fixed length of output for various lengths of inputs (namely seeds). The fixed length of output is referred to as the hash or message digest of the inputs.

For a secure Hash function H, the following requirements must be satisfied:

1) H can be applied to various sizes of data;
2) H can produce fixed size of output;
3) For any given input x, the computation of $H(x)$ is relatively simple and fast;
4) For any given code h, it is impossible to find x such that $H(x)=h$;
5) For any given input x, it is impossible to find y that does not equal to x such that $H(x)=H(y)$.

The two-way algorithm is an algorithm capable of encryption/decryption which can be used to encrypt the plain text into the cipher text, or decrypt the cipher text into the plain text. Some two-way algorithms employ asymmetric key infrastructure, i.e. the key used for encrypting and that for decrypting are different. These two keys depend on each other. That is, the information resulting from encryption using anyone of the keys can only be decrypted using another key.

SUMMARY OF THE INVENTION

To resolve the problems of the prior art as mentioned above, the embodiments of present invention provide a method for customizing customer identifier, comprising steps of:

Step A: sending seed data to an application interface of an electronic device by a customer;

Step B: generating the identifier from the seed data using one or more algorithms;

Step C: storing the identifier into the electronic device.

Optionally, an authentication is conducted before sending the seed data in Step A.

Optionally, the authentication is completed by inputting an initial password of the electronic device.

Optionally, the authentication is completed by inputting a manufacturer serial number of the electronic device.

Optionally, the one or more algorithms used in Step B are one-way algorithm(s).

Optionally, a process of generating the identifier from the seed data using the one or more algorithms is accomplished within the electronic device.

Optionally, the identifier in Step C is stored in a non-volatile memory of the electronic device.

Optionally, the identifier stored in the non-volatile memory is readable out with a reader or program.

For the manufacturer, both the management cost and the stock are reduced, and the error possibility of the product when leaving the factory is reduced as well. For the customer, the security of customizing the identifier is ensured, and a counterfeit or piracy of their identifiers among customers is prevented.

BRIEF DESCRIPTION OF THE DRAWINGS

The present invention may be further understood from the following description in conjunction with the appended drawing. In the drawing.

DETAILED DESCRIPTION OF THE EMBODIMENTS

Figure 1:
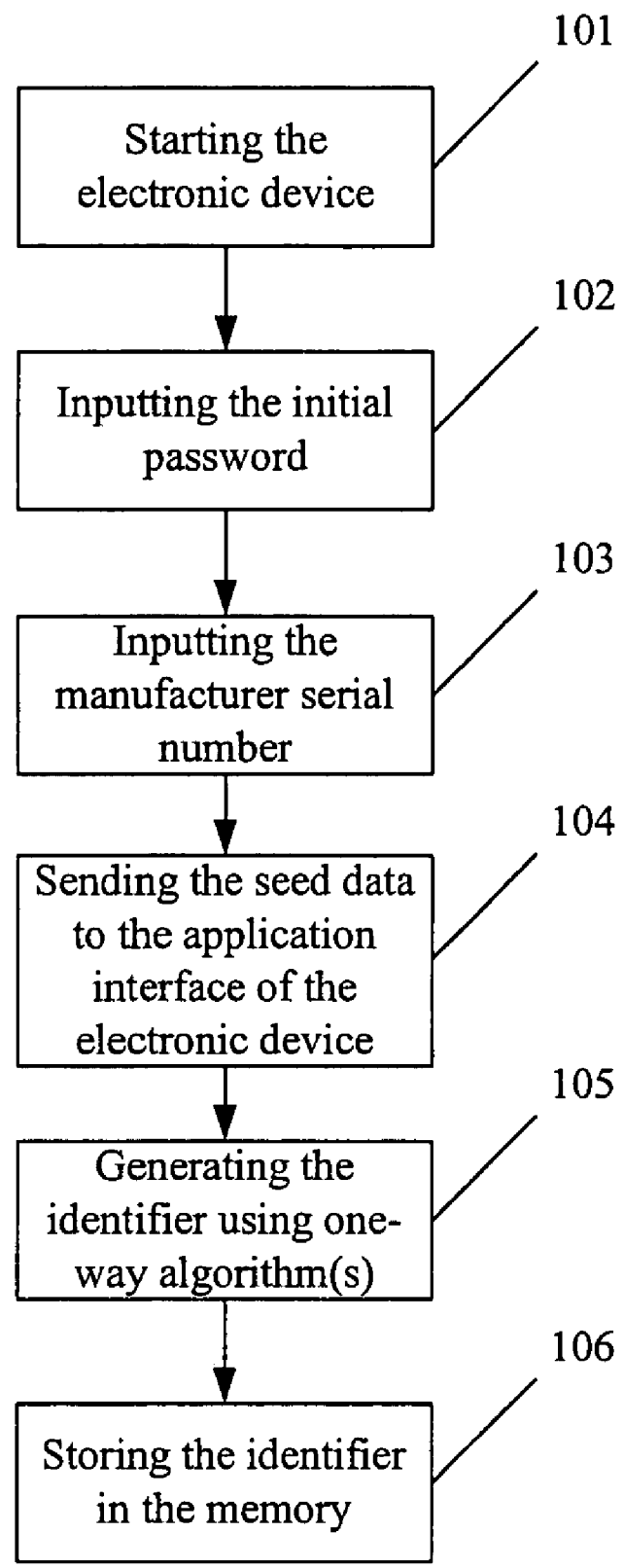
FIG. 1 is a flow diagram of the method for customizing customer identifier.

The present invention is further described with the embodiments and the drawing below. But the following description should not be considered as the limitation to the present invention.

Referring to FIG. 1, the present invention provides a method for customizing customer identifier, which comprises the following steps:

Step 101, the customer starts the electronic device provided by a manufacturer which is a hardware device into which an identifier is to be written when the customer customizes the customer identifier;

Step 102, the customer inputs the initial password of the electronic device for authenticating;

Step 103, the customer inputs the manufacturer serial number of the electronic device for authenticating;

Step 104, the customer sends seed data to the application interface of the electronic device;

Step 105, an identifier is generated from the seed data using one or more one-way algorithms. This computing process may be performed generally within the electronic device and in practice within the application interface of the electronic device;

In addition, it is possible to compute the seed data using a two-way algorithm instead of the one-way algorithm.

Step 106, the identifier is stored in the non-volatile memory of the electronic device. This identifier is the identifier of the electronic device, which can then be read out through a reader or program provided by the manufacturer.

The Step 102 in the above mentioned method aims at the electronic device which needs to be authenticated with the password. If the electronic device does not need to be authenticated with the password, this Step could be ignored. And the Step 103 aims at the electronic device which needs to be authenticated with the manufacturer serial number. If the electronic device does not need to be authenticated with the manufacturer serial number, this Step could be ignored.

With regard to the protection of interests of legitimate customers, even if another customer has read the encrypted identifier out with a reader or program obtained from the manufacturer by illegal means, he cannot obtain the seed data through a reverse computation. Also, a correct identifier cannot be generated without the seed data. Therefore, the identifier written into the non-volatile memory is not the correct customer identifier. So, the problem about the piracy of other electronic devices can also be resolved. Even the manufacturer cannot acquire the seed data written by legitimate customers. Therefore, it is impossible for others to counterfeit the identifier, and the interests of customers are protected.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method for customizing customer identifier, comprising the steps of:
    inputting and sending seed data to an application interface of an electronic device by a customer that is an integrator or a distributor or a channel partner of the electronic device;
    generating, by the electronic device and within the electronic device, an identifier by applying a one-way algorithm to the seed data input and sent by the customer, wherein the identifier distinguishes the electronic device from electronic devices of another integrator or distributor or channel partner;
    storing the identifier into a non-volatile memory of the electronic device and identifying the electronic device with the stored identifier; and
    reading the stored identifier from the electronic device and consequently determining the identity of the customer by using the stored identifier.

2. The method of claim 1, wherein an authentication is conducted before sending the seed data.

3. The method of claim 2, wherein the authentication is completed by inputting an initial password of the electronic device.

4. The method of claim 2, wherein the authentication is completed by inputting a manufacturer serial number of the electronic device.

5. The method of claim 1, wherein the identifier stored in the non-volatile memory is readable out with a reader or program.

\* \* \* \* \*